United States Patent [19]

Kahn et al.

[11] 4,040,808

[45] Aug. 9, 1977

[54] METHOD FOR MANUFACTURE OF VANADIUM DIOXIDE POLYCONDUCTORS

[75] Inventors: David Kahn; Raymond James Geckle, both of Harrisburg, Pa.

[73] Assignee: AMP Incorporated, Harrisburg, Pa.

[21] Appl. No.: 598,913

[22] Filed: July 24, 1975

Related U.S. Application Data

[62] Division of Ser. No. 479,242, June 14, 1974, Pat. No. 3,983,074.

[51] Int. Cl.[2] .................... C03B 32/00; C03B 35/00; H01B 1/06

[52] U.S. Cl. .................... 65/33; 65/134; 106/47 R; 106/39.5; 252/518; 252/520; 65/59 R

[58] Field of Search .................... 65/33, 134, 59 R; 106/47 R, 39.5; 252/518, 520

[56] References Cited

U.S. PATENT DOCUMENTS

| | | | |
|---|---|---|---|
| 3,402,131 | 9/1968 | Futaki et al. | 252/518.4 X |
| 3,408,212 | 10/1968 | Dumesnil | 65/33 X |
| 3,484,611 | 12/1969 | Futaki | 252/518.4 X |
| 3,518,209 | 6/1970 | Provance | 106/47 R X |
| 3,557,026 | 1/1971 | Teeg et al. | 252/518.4 |
| 3,562,188 | 2/1971 | Mitusishi et al. | 252/518.4 |
| 3,598,762 | 8/1971 | Futaki et al. | 252/518.4 |
| 3,650,778 | 3/1972 | Dumesnil et al. | 106/47 R |
| 3,862,829 | 1/1975 | Brandmayr | 65/33 X |
| 3,910,796 | 10/1975 | Asahara | 106/47 R X |
| 3,932,312 | 1/1976 | Kazmierowicz | 106/47 R X |
| 3,993,603 | 11/1976 | Nalepa et al. | 106/39.5 X |

*Primary Examiner*—S. Leon Bashore
*Assistant Examiner*—Frank W. Miga
*Attorney, Agent, or Firm*—Russell J. Egan

[57] ABSTRACT

A method for the production of an article suitable as a circuit element is formed by admixing vanadium dioxide or doped vanadium dioxide with a binder of vanadium pentoxide and phosphorus pentoxide then heating and shaping the admixture into a shape.

4 Claims, 1 Drawing Figure

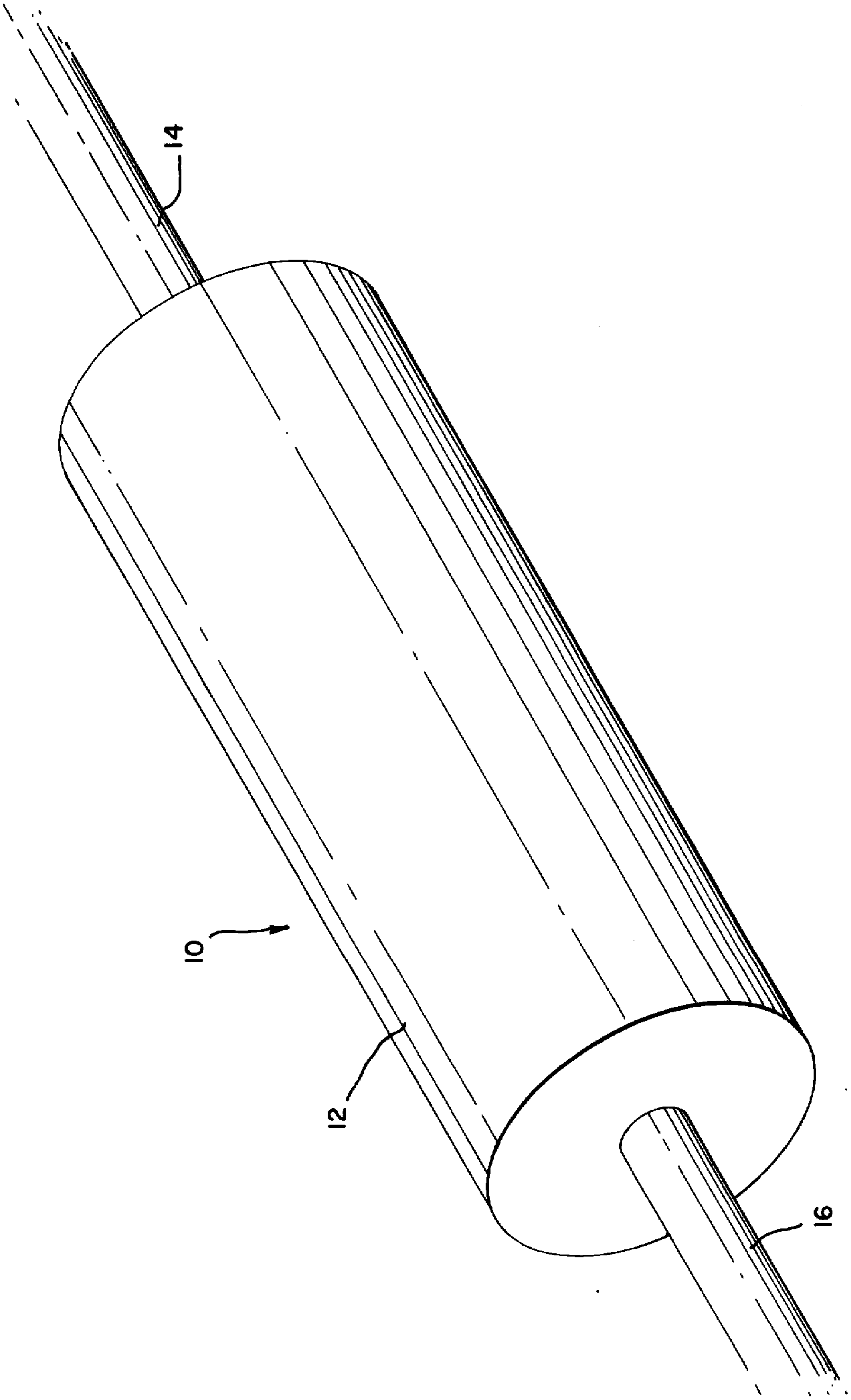
14
10
12
16

METHOD FOR MANUFACTURE OF VANADIUM DIOXIDE POLYCONDUCTORS

This application is a division, of application Ser. No. 479,242 filed June 14, 1974, now U.S. Pat. No. 3,983,074 issued Sept. 28, 1976.

This invention pertains to an article of manufacture suitable as a circuit element, more particularly, this invention pertains to a polyconductive shape in a form such as a pellet, rod, disk, truncated cone, or a cylinder which possesses a structual integrity and at the same time has the operating characteristics of typically used polyconductive devices consisting of single crystals or compacted powders. The methods for preparing these articles of manufacture are within the scope of the invention and consist of mixing the polyconductive materials in a binder, pressing the mixture at the proper temperature and pressure, and obtaining the above disclosed shapes useful as articles of manufacture in electrical circuit element assemblies.

In U.S. Pat. No. 3,846,776 a circuit element combination employing polyconductors has been disclosed. Moreover, the polyconductor devices have rendered this and similar circuits eminently useful. These polyconductors have been disclosed as being encapsulated in a powder form in various devices whereby the end result has been a device which provides the necessary advantages over the prior art.

In general, the disclosed devices have used the vanadium dioxide polyconductor in its powdered form and encapsulated or admixed various other additives to it. Generally, a spring operated, appropriate biasing device establishes contact between the powder and a lead wire. These prior art devices can also be packaged in other suitable forms to achieve the end result.

It has now been discovered that the polyconductor elements per se, that is the vanadium dioxide or like elements, in the combinations described in the prior art, can be improved as an article of manufacture. When improved according to the novel invention, structurally strong and resistant shapes or pellets of various shapes and forms having the required dimensions may be produced, which will give a tailored performance and reproducible characteristics, such as in the above described circuit element.

Thus, it has now been found that in the production of the article of manufacture, the vanadium dioxide can be suitably employed in a binder which then is caused to flow at a suitably high temperature to form a unitary shape. Melting of the binder will produce a polyconductive device having predictable and reproducible characteristics without depending on the heterogeneous characteristics of powder.

Consequently, the novel device, which has been produced herein and shown by various embodiments in the examples to follow has improved crush strength, improved tensile and torsion strengths, improved shear strength, and the temperature versus conductivity response is remarkably satisfactory over a wide range. That is, the novel article of manufacture possesses temperature response over the indicated temperature range which is substantially invariable despite the change in the volume of the device when it changes its polyconducting state. The novel devices are also capable of switching from a temperature of 60° F to 190° F, if a suitably doped $VO_2$ polyconductor is used.

Inasmuch as hot pressing of a powdered vanadium oxide at a theoretical density of 90% is required to produce anisotropic properties in the powder, the prior art problems associated with anisotropic behavior of the powdered devices has been eliminated and thus more predictable end results are achieved.

As it can well be appreciated, binders which would affect the electrical properties of the polyconductors cannot be employed. Hence, it is necessary that a binder is used which cooperates with the polyconductive device in such a manner as to enhance or, at a minimum, not to impair the properties of the polyconductor.

In accordance with the above invention, it has now been found that when a vanadium dioxide (which is normally produced as a crystalline powder) is admixed in a ratio of 5% to 50% by weight with a mixture consisting of 85% to 50% $V_2O_5$ and complementary amounts of $P_2O_5$ on mole basis, such that the percentages in the binder making up between the two components amount to 100%, and the admixture, i.e., binder to polyconductive crystallite, is heated, and pressed into shape, a novel article is obtained. In accordance with the invention, the obtained mixture when melted together will produce a glass with a softening temperature of about 403° C. These glasses can be made as indicated above by varying the amount of vanadium pentoxide $V_2O_5$ from 85 to 50 percent, by mole. It is noted that the polyconductivity of vanadium dioxide is not affected by melting at temperatures of 403° C and above. Thus, the melting can be carried out at temperatures which provide easy working of the admixture at the desired melting temperatures. As these glasses will adhere strongly to the vanadian dioxide crystallites because vanadium dioxide is soluble in liquid $V_2O_5$, the binding action produces a composite having especially noteworthy and desirable properties as a rugged electrical component.

In addition, the advantage of using the vanadium pentoxide-phosphorus pentoxide mixture as a glass binder is that the vanadium oxide glass binder will also switch or act as a polyconductor at about the same temperature as the vanadium dioxide crystalline, i.e., at about 68° C.

For example, data show that a mixture of 80% to 20% glass consisting of $V_2O_5$ to $P_2O_5$ (mole percent), has a voltage threshold for switching that extrapolates to 0 applied voltage at approximately 68° C. [cf. M. Regan & C. F. Drake. Mat. Res. Bull. 7, 1559–1562 (1972)]. Consequently, inasmuch as the amount of the vanadium dioxide crystallite can now be determined in the glass and inasmuch as the ratio of the vanadium pentoxide-phosphorus pentoxide mixture to the vanadium dioxide can be varied, pellets of various dimensions, which may be obtained and varied, can be provided for optimum performance characteristic in the same manner as resistance elements in circuit devices.

Still further, as the binder elements will now participate in the polyconductivity and thus the packaging problems associated with the prior art polyconductive devices are now eliminated and/or minimized and more complex shapes or devices replaced with an eminently more suitable device, the advantages are fairly manifest. As it is now possible in the softening stage to shape the uniformly admixed components, it is easy in the manufacturing stage to produce the necessary beads or pellets or shapes. The elements which establish the electrical contact to the pellet can be provided as part of the beads and will be unaffected during the normal circuit element operation behavior.

Thus, with reference to the FIGURE therein, it illustrates a typical shape of a suitable polyconducting device 10.

A polyconducting body of the character described above is designated by item 12 in the FIGURE. A lead 14 for connecting the device to a suitable circuit at one end, and a lead 16 to complete the circuit are shown in the FIGURE.

In accordance with the invention, the structurally sound pellets of the shape shown in the FIGURE have the following characteristics based on the mechanical properties as shown by the data below.

Thus, pellets have been prepared from intimate mixtures of $VO_2$ powder and $V_2O_5/P_2O_5$ glass powder. The weight ratio of glass to $VO_2$ has been varied from 5 to 50%. The glass binder itslf was varied from 80/20 mole percent $V_2O_5/P_2O_5$ to 54/46 mole percent; or in the general range, the amount is 80 mole percent to about 50 mole percent vanadium pentoxide, the complimentary amount being phosphorous pentoxide. The electrical behavior of the pellets shows the same overall characteristics of the $VO_2$ powder. That is, the transition to a conducting state at 68° C with the accompanying fall in resistivity is still observed. The total resistance is changed by the dilution of $VO_2$ content by the binder, as would be expected.

Significantly, some pellets have been hot pressed containing only the glass binder. Those pellets also show a drop in resistivity at 68° C which can be identified with the polyconductive transition of the $V^{4+}$ ions in the glass. This supports the contention that the binder does transform with the $VO_2$.

As an example of pellet strength, a pellet consisting of 5% by weight of 80% to 20% $V_2O_5$ to $P_2O_5$ glass (percent on mole basis) was hot pressed (melt flow) at a temperature of 400° C and a pressure of 55,000 lbs. per $in^2$ for approximately 1 minute to a density of 92% theoretical. This pellet had a compressive strength of 24,000 lbs. per $in^2$ at room temperature.

A hot pressed pellet of $VO_2$ only, compressed at the same temperature and pressure to a density of 81% of theoretical had a compressive strength of 12,700 lbs per $in^2$.

As might be expected the compressive strength is a sensitive function of the density of the pellet. Hence, a density of about 80% and higher of theoretical density must be achieved with the melting or flowing of the binder at a temperature of at least 360° C, preferably 400° C and above the melting point of the binder, generally from 370° C to 540° C; the preferred range is 400° C to 500° C. As an illustration, a pellet containing 5% by weight of a 75% to 25% $V_2O_5$ to $P_2O_5$ glass (percent on mole basis) compressed at 315° C and 36,000 lbs. per $in^2$ had a density of 76% of theoretical density and a compressive strength of 1090 lbs. per $in^2$.

A theoretical density of 98% has been achieved with the above mixtures.

The $VO_2$ and binder mixtures may be pressed into any shape. The resistance at any temperature will of course depend on the diameter and length of the pellet, and is easily tailored to suit the particular needs.

Lead wires have been embedded in the hot pressed pellet. These pellets show the same behavior as the other pellets.

In general, the vanadium dioxide crystallites range in the size 5 to 40 microns preferably 10 to 20 microns and the mixture of vanadium pentoxide-phosphorous pentoxide of a size 5 to 40 microns. These powders as illustrated above are compacted and then melted. The admixtures of vanadium dioxide and the glass binder can be shaped and then hot pressed in a suitable mold well known in the glass forming arts to obtain the desired shapes.

Although $P_2O_5/V_2O_5$ glasses can be used as a polyconductive device, it has been found that vanadium dioxide material is best employed for this purpose, because the transformation range is much larger and since all of the vanadium ions in $VO_2$ have the required $V^{4+}$ valence.

The vanadium dioxide crystals may be doped and charged with various oxides to change the transition temperature. The present vanadium dioxide devices thus admixed when suspended in the above indicated glass binder perform more advantageously for the intended purposes, including the wire ended devices such as shown in the FIGURE than the prior art devices similarly doped. Inasmuch as the glass binder itself cannot be doped but as the vanadium oxides can be doped, such as with niobium and other metal oxides well known in the art, the end result is that the vanadium dioxide crystallites can now be formed into various shapes useful in the electrical device art. Suitable dopants for the vanadium dioxide are the oxides of Cr, Fe, Ga, Al, Ti, Ir, Os, Ru, Ge, Nb, Ta, Mo, or W or mixtures of oxides of same.

The amount of dopant added is sufficient to alter the transition temperature within the range from 30° C to 100° C and is established by the desired transition temperature.

What is claimed is:

1. A method for the production of a polyconducting device comprising vanadium dioxide in a binder by the steps comprising:

a. admixing, (1) a member selected from the group consisting of particulate vanadium dioxide, and (2) doped vanadium oxide, wherein the dopant is an oxide selected from the group consisting of Cr, Fe, Ga, Al, Ti, Os, Ru, Ge, Nb, Ta, Mo and W, and mixtures of oxides of the same, with particulate binder in a ratio of from 5-50%, said particulate binder consisting essentially of 80% to 50% of vanadium pentoxide with complementary proportions of phosphorus pentoxide, to obtain a powdered mixture of said binder and said vanadium dioxide;

b. heating said mixture to effect melting of the binder to produce a glass;

c. shaping said glass under a pressure sufficient to achieve a density in said mixture of at least 80% of the theoretical density of the vanadium dioxide and binder; and d. cooling said glass to obtain said polyconductive device.

2. A method according to claim 1 wherein the particulate vanadium dioxide is in the form of crystallites which have particle sizes in the range of 5-50 microns.

3. A method according to claim 1 wherein said heating step (b) is conducted at a temperature of 400° C. to 500° C.

4. A method according to claim 1 wherein lead wires are embedded in said glass prior to cooling and the resulting product is a wire-ended polyconducting device.

* * * * *